United States Patent [19]

Vanderpool et al.

[11] 4,397,690

[45] Aug. 9, 1983

[54] PROCESS FOR RECOVERING GOLD

[75] Inventors: Clarence D. Vanderpool; Brice E. Martin; Richard G. W. Gingerich, all of Towanda, Pa.

[73] Assignee: GTE Products Corporation, Stamford, Conn.

[21] Appl. No.: 420,458

[22] Filed: Sep. 20, 1982

[51] Int. Cl.³ .............................................. C22B 11/00
[52] U.S. Cl. ........................................ 75/108; 423/39; 423/38; 75/101 R; 75/118 R; 75/121
[58] Field of Search .................... 75/121, 118 R, 108; 423/38, 39; 156/654; 252/79.1 YP, 79.1 R

[56] References Cited

U.S. PATENT DOCUMENTS

| | | | |
|---|---|---|---|
| 3,495,976 | 2/1970 | Bazilevsky et al. | 423/38 |
| 3,957,505 | 5/1976 | Homick et al. | 75/108 |
| 4,190,489 | 2/1980 | Bahl et al. | 423/38 |
| 4,260,451 | 4/1981 | Schmeckenbecher | 423/38 |
| 4,319,922 | 3/1982 | Macdonald | 75/118 R |
| 4,319,923 | 3/1982 | Falanga et al. | 75/118 R |

OTHER PUBLICATIONS

Interrante, M. J., "Reworking Multilayer Ceramic Metal Layers" IBM Technical Disclosure Bulletin vol. 18, #2, Jul. 1975, p. 413.

Lindenborg, G. C., "Method of Recovering Spent Potassium Iodide Solution" Western Electric Technical Digest #45, Jan. 1977, pp. 23–24.

*Primary Examiner*—O. R. Vertiz
*Assistant Examiner*—Robert L. Stoll
*Attorney, Agent, or Firm*—Robert E. Walter

[57] ABSTRACT

Gold is recovered from a material including gold and molybdenum or tungsten by contacting the material with an aqueous solution of hydrogen iodide and iodine to solubilize the gold without solubilizing the molybdenum or tungsten and recovering the gold from the solution.

8 Claims, No Drawings

PROCESS FOR RECOVERING GOLD

The present invention relates to the recovery of gold from molybdenum and tungsten materials containing gold.

In many electrical and space applications gold is used as a coating on molybdenum and tungsten products such as a wire. The gold is typically plated or bonded so that recovery of the gold from scrap material is difficult without affecting the molybdenum or tungsten substrate. Typically methods of dissolving gold include sodium cyanide solution which results in a highly toxic polutant. Other dissolution processes, such as aqua regia or aqueous chlorine solution are not suited since the molybdenum or tungsten substrate is also attacked.

SUMMARY OF INVENTION

Gold is recovered from material including gold and molybdenum or tungsten by contacting the material with an aqueous solution of hydrogen iodide and iodine. The iodine is present at a desired concentration and in an amount sufficient to solubilize a major portion of the gold in the material and leave the tungsten or molybdenum metal as residue. The hydrogen iodide is present in an amount to provide for increased solubility of said iodine at the desired concentration.

DETAILED DESCRIPTION

The scrap material from which gold is recovered generally comprises molybdenum or tungsten which has been plated with gold by an electrochemical process or in which gold has been bonded to the molybdenum or tungsten substrate by some other process. Typically the scrap may be in the form of a tungsten or molybdenum wire having a coating of gold.

The scrap material is contacted with an aqueous solution of hydrogen iodide and iodine. The iodine is present at a concentration and in an amount sufficient to solubitize a major portion of the gold. Preferable about 1 to about 10 parts of iodine are present per 100 parts of water. Since iodine is insoluble in water, hydrogen iodide is present in an amount sufficient to provide for solubility of the iodine at the desired amount. Preferably hydrogen iodide is present in an amount from about 1 to about 10 parts of hydrogen iodide per 100 parts of water. Preferably the aqueous solution consist essentially of hydrogen iodide, iodine and water and the scrap consist essentially of gold and molybdenum and tungsten. Both the scrap and the solution may include other additives or impurities provided such ingredients do not interfere with the solubilization process or subsequent recovery of gold from a solution. Generally the solution should comprise from about 200 to about 400 grams of iodine per troy ounce of gold present in the scrap.

The contacting step may be carried out conveniently in a batch type process where the scrap is immersed in the aqueous iodine containing solution. Preferably the solution is heated to a temperature of from about 50 to about 75 degrees centigrade for a period of about 15 minutes. Time and temperature do not appear to be critical except that higher temperatures tend to reduce the length of reaction time. Since it is often difficult to predict the amount of gold in the scrap, the process may be carried out with successive decreasing additions of aqueous hydrogen iodide and iodine solution. The amount of iodine needed may be initially estimated and a solution prepared. As the reaction proceeds, the characteristic iodine color disappears. If unsolubilized gold is present, a further addition of solution may be made. Preferably the additions may be made in decreasing amounts until substantially all the gold is solubilized in a resulting solution. Only a negligible amount of molybdenum or tungsten is solubilized.

The resulting solution comprising solubilized gold is separated from the molybdenum or tungsten residue. This may be conveniently performed by decanting the liquid after the contacting step. The separated solution containing solubilized gold is heated to remove the iodine which may be collected by condensation from the vapor stage for reuse. Gold is deposited from the solution as pure gold. The pure gold precipitate may be conveniently separated by any solid-liquid separation method such as of filtration.

EXAMPLE 1

About 2.9 grams of molybdenum wire plated so that 6 percent of the wire weight is attributable to the gold is placed into an iodide solution. The iodide solution comprises 50 cc. of reagent grade hydrogen iodide, (55% HI) about 50 cc. of water and about one gram of iodine. The solution was warmed to about 60 degrees Centigrade. After a few minutes the color of the iodine cleared. It appeared that substantially all the gold was stripped from the wire. The wire was washed and dried and the resulting solution was heated to precipitate the gold. The wire had lost about 1.8 grams of gold. The total weight loss from the wire was 6.16%.

EXAMPLE 2

A sample of molybdenum wire weighing about 1.18 grams without a gold coating was placed in an iodine solution as described in Example 1. The sample lost 0.016% weight.

EXAMPLE 3

A sample of tungsten wire having about 10% of the total weight gold was placed in an iodine solution as prepared in Example 1. The sample lost about 3.8 grams or about 10%. The gold was recovered as set forth in Example 1.

EXAMPLE 4

A sample of tungsten wire without a gold coating was treated as in Example 2 with a corresponding weight loss of about 0.024 percent.

We claim:

1. A process for recovery of gold from material including gold and molybdenum or tungsten comprising contacting said material with an aqueous solution consisting essentially of hydrogen iodide and iodine and water, said iodine being present at a desired concentration and an amount sufficient to solubilize a major portion of said gold and leaving molybdenum or tungsten said hydrogen iodide being present in an amount sufficient to provide for increased solubility of said iodine at said desired concentration.

2. A process according to claim 1 wherein said aqueous solution of hydrogen iodide and iodine comprises from about 1 to about 10 parts of hydrogen iodide per 100 parts of water and from about 1 to about 10 parts of iodine per 100 parts of water.

3. A process according to claim 1 wherein said material comprised gold bonded to tungsten or molybdenum.

4. A process according to claim 1 wherein about 200 to about 400 grams of iodine is used per troy ounce of gold.

5. A process according to claim 1 wherein said aqueous solution is heated to a temperature of about 40 to about 70 degrees centigrade during contacting.

6. A process according to claim 1 werein successive additions of water, hydrogen iodide and iodine are made during said contacting.

7. A process according to claim 1 wherein after sulubilizing said gold, said aqueous solution contining solubilized gold is heated to a sufficient temperature to vaporize said iodine and precipitate gold.

8. A process according to claim 7 wherein said vaporized iodine is condensed for reuse as iodine.

* * * * *